United States Patent [19]
Lewis

[11] Patent Number: 5,904,618
[45] Date of Patent: May 18, 1999

[54] PRESSURE RELIEF VALVE

[75] Inventor: Jeffrey C. Lewis, Rochester Hills, Mich.

[73] Assignee: TRW Inc., Cleveland, Ohio

[21] Appl. No.: 08/837,576

[22] Filed: Apr. 21, 1997

[51] Int. Cl.⁶ ................................................ B60H 1/24
[52] U.S. Cl. ...................... 454/162; 251/366; 137/855
[58] Field of Search .................... 454/162, 164, 454/165; 137/843, 855; 264/250, 252

[56] References Cited

U.S. PATENT DOCUMENTS

| | | |
|---|---|---|
| 4,566,704 | 1/1986 | Van Dongeren . |
| 4,588,105 | 5/1986 | Schmitz et al. . |
| 4,760,935 | 8/1988 | van den Beld et al. . |
| 4,761,319 | 8/1988 | Kraus et al. . |
| 4,801,040 | 1/1989 | Kraus . |
| 4,938,378 | 7/1990 | Kraus . |
| 4,953,742 | 9/1990 | Kraus . |
| 4,998,642 | 3/1991 | Kraus . |
| 5,071,022 | 12/1991 | Sick . |
| 5,105,731 | 4/1992 | Kraus ................................... 454/162 X |
| 5,105,849 | 4/1992 | Clough . |
| 5,194,038 | 3/1993 | Klomhaus et al. ..................... 454/162 |
| 5,263,895 | 11/1993 | Kraus et al. ............................. 454/162 |
| 5,492,505 | 2/1996 | Bell et al. ................................ 454/162 |
| 5,503,178 | 4/1996 | Miskelley et al. .................. 454/165 X |
| 5,591,528 | 1/1997 | Fisher et al. . |
| 5,601,117 | 2/1997 | Lewis et al. ........................ 454/162 X |
| 5,643,521 | 7/1997 | Nehm ..................................... 264/255 |

FOREIGN PATENT DOCUMENTS 40 23 190  1/1992  Germany .

OTHER PUBLICATIONS

EP 98 10 7264 European Search Report.

*Primary Examiner*—Harold Joyce
*Attorney, Agent, or Firm*—Fay, Sharpe, Beall, Fagan, Minnich & McKee, LLP

[57] ABSTRACT

A flap-type pressure relief valve particularly intended for relieving overpressure conditions in a vehicle passenger compartment includes a frame having an integral peripheral sealing gasket that is formed on the frame by being injection molded directly thereto. The frame is molded from a relatively rigid plastic and the gasket is molded from a plastic that is significantly more resilient and flexible but selected to permanently bond to the plastic of the frame when brought into contact therewith under injection molding conditions.

11 Claims, 4 Drawing Sheets

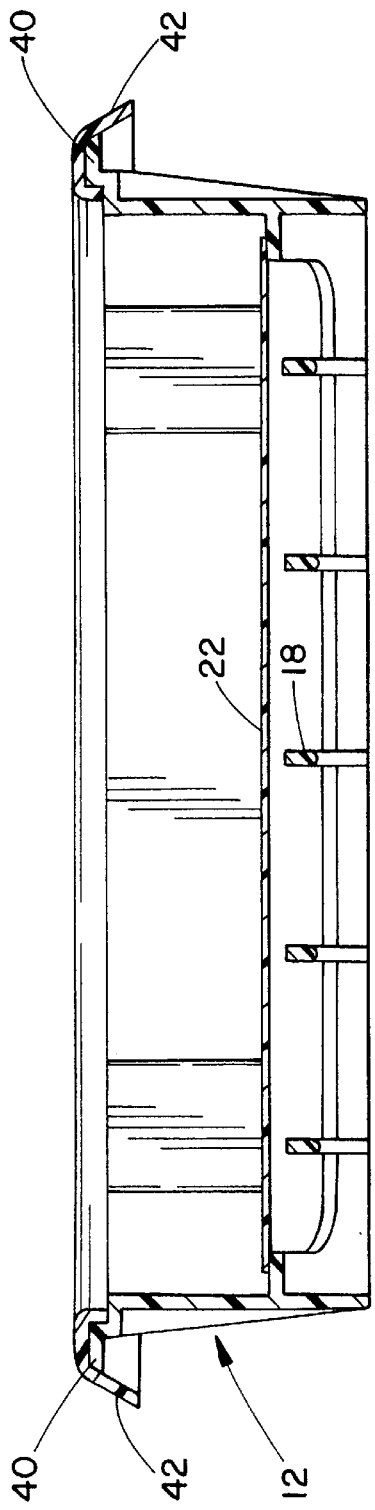
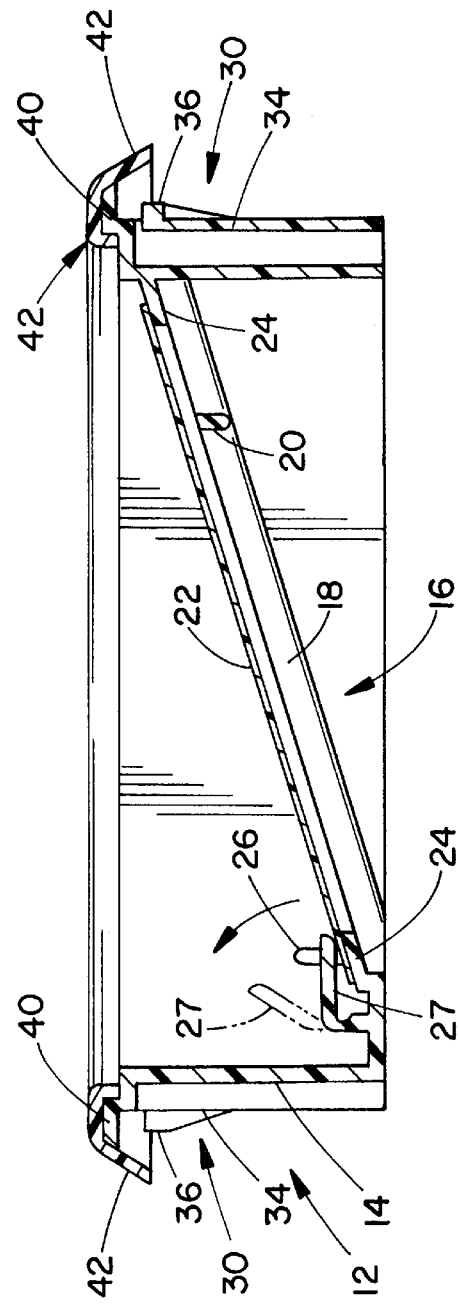

PRESSURE RELIEF VALVE

BACKGROUND OF THE INVENTION

The subject invention is directed to the valve art and, more particularly, to a flap-type relief or check valve.

Valves of the type under consideration are commonly used to relieve overpressure conditions in vehicle passenger compartments. Typically, the valves comprise a frame which defines a flow passage and a plurality of valve seats. Flexible valve flaps are joined to the frame along one edge and overlie the valve seats. Should an overpressure condition occur on the upstream side of the valve, the flaps move to an open position until pressure balance is achieved at which time the flaps close and prevent reverse flow into the passenger compartment.

A valve of the type discussed is illustrated in U.S. Pat. No. 5,105,731. In the valve shown therein, the main frame of the valve is arranged to fit within an opening in a body panel of the vehicle. The frame is held in position by resilient clips molded in the frame. A suitable resilient seal or gasket is clamped between the periphery of the frame and the vehicle body panel to prevent undesired ingress of air or water.

The use of the separate seal or gasket member between the frame and the body panel has caused assembly problems. In addition, the separate gasket increases inventory problems.

SUMMARY OF THE INVENTION

The subject invention provides a flap valve design and method of forming the same that overcomes the noted problems and results in a valve wherein the main frame and peripheral gasket are integrally joined. For all practical purposes, the result is a one-piece frame and gasket structure.

In particular, and in accordance with one aspect of the invention, there is provided a flap-type pressure relief valve which includes a molded plastic main frame having a rigid peripheral side wall defining a central flow passage. A flexible flap valve element is joined to the main frame and overlies the central flow passage to permit flow in one direction while preventing flow in the opposite direction. The main frame has a circumferentially extending wall portion that lies in a position radially outward of the central flow passage and is joined to the rigid peripheral wall. A gasket is formed continuously about the main frame and has a first flexible free end located radially outwardly of the circumferentially extending wall portion with a base portion overlying and molded directly to the circumferentially extending wall portion to bond thereto. The gasket is molded from a plastic significantly more resilient and flexible than the plastic forming the main frame but is selected to permanently bond thereto when brought into contact therewith under injection molding conditions.

In accordance with a more limited aspect of the invention, the gasket tapers from the base portion to the free end portion and retainers are formed on the main frame at locations spaced from the gasket on said rigid peripheral wall.

By molding the gasket directly to the main frame, the problems associated with mounting the gasket in position and/or installing the valve and gasket assembly into a vehicle body panel are substantially eliminated. Rather, the frame and gasket assembly becomes what is in effect a one-piece unitary structure with the gasket integrally formed with the main frame but having the necessary resilient characteristics to perform the sealing function necessary for the gasket.

In accordance with a still further aspect of the invention, there is provided a method of forming a flap-type pressure relief valve of the type including a main frame defining a flow passage and a flap valve element positioned to overlie the flow passage. The improved method comprises first molding the main frame from a relatively rigid plastic which provides the main frame with the necessary rigidity and strength. Subsequently, the main frame is positioned in a mold contoured to provide a gasket-forming chamber located about the periphery of the main frame with a first peripheral wall portion of the main frame constituting a wall of the gasket-forming chamber. Thereafter, a resilient plastic is injected into the gasket-forming chamber under conditions to fill the gasket-forming chamber and integrally bond to the first peripheral wall portion of the main frame. Preferably, the gasket-forming chamber is contoured to provide a flexible tapered lip seal-type gasket which extends radially outwardly from the main frame circumferentially continuous thereabout.

As can be seen from the foregoing, a primary object of the invention is the provision of a flap-type valve and method of forming the same which results in what is effectively a unitary combined gasket and frame structure that does not require separate assembly of a gasket into a frame.

A further object of the invention is the provision of an apparatus and method of forming the same wherein the gasket is formed as an integral part of the main frame but is molded from a plastic having highly desirable characteristics for use as a gasket.

A further object of the invention is the provision of a flap-type valve of the type described wherein the gasket is formed directly to the main frame by an injection molding process.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIGS. 5 and 6 are cross-sectional views taken on lines 5—5 and 6—6, respectively, of FIG. 2;

DETAILED DESCRIPTION OF THE PREFERRED EMBODIMENT

Figure 1:
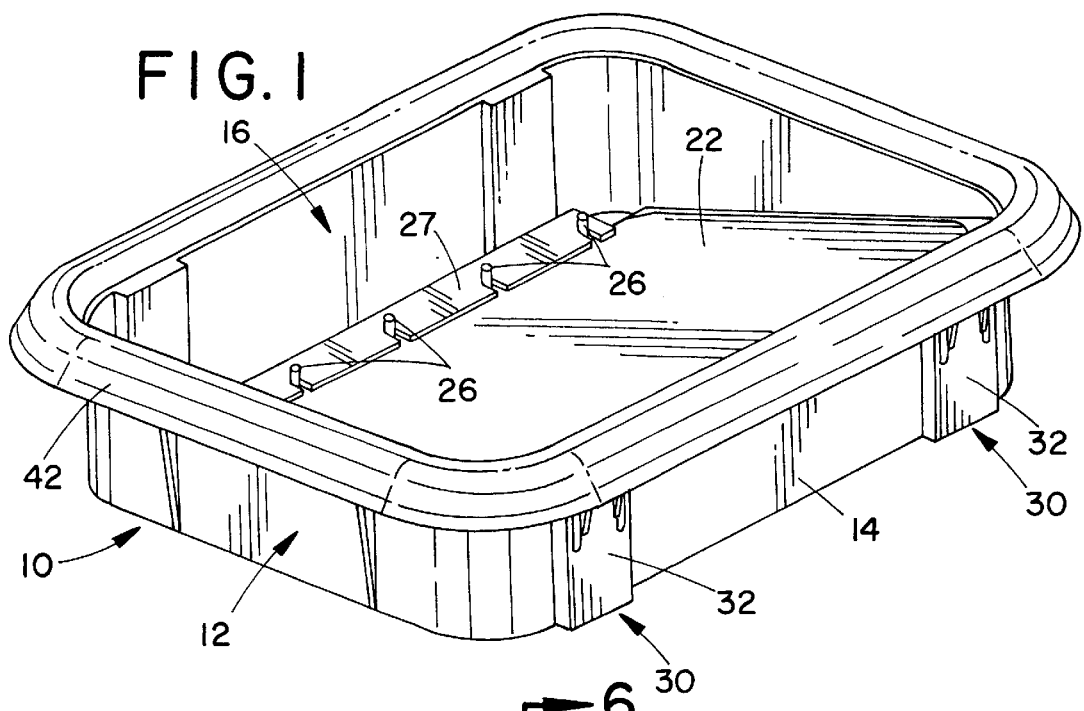
FIG. 1 is an isometric view showing the overall arrangement of a flap-type pressure relief valve formed in accordance with the preferred embodiment of the invention.
Figure 2:
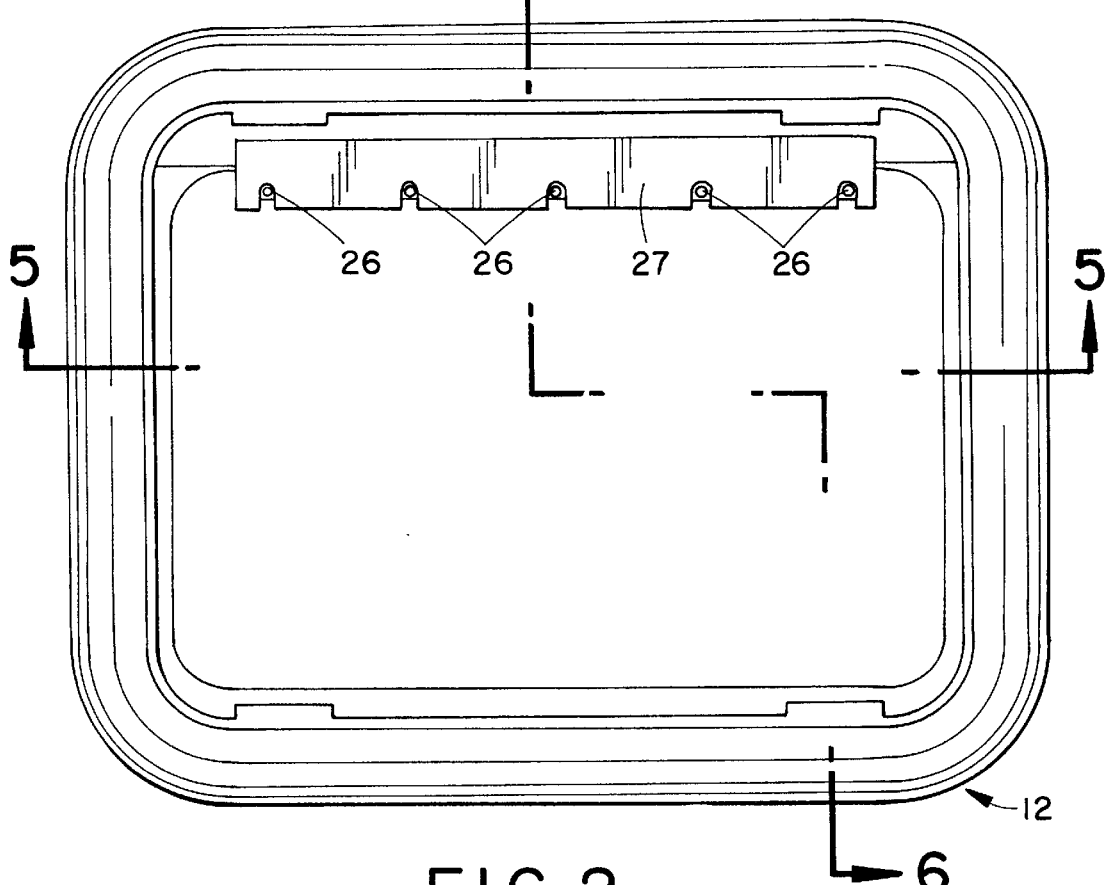
FIG. 2 is a plan view of the structure shown in FIG. 1.
Figure 3:
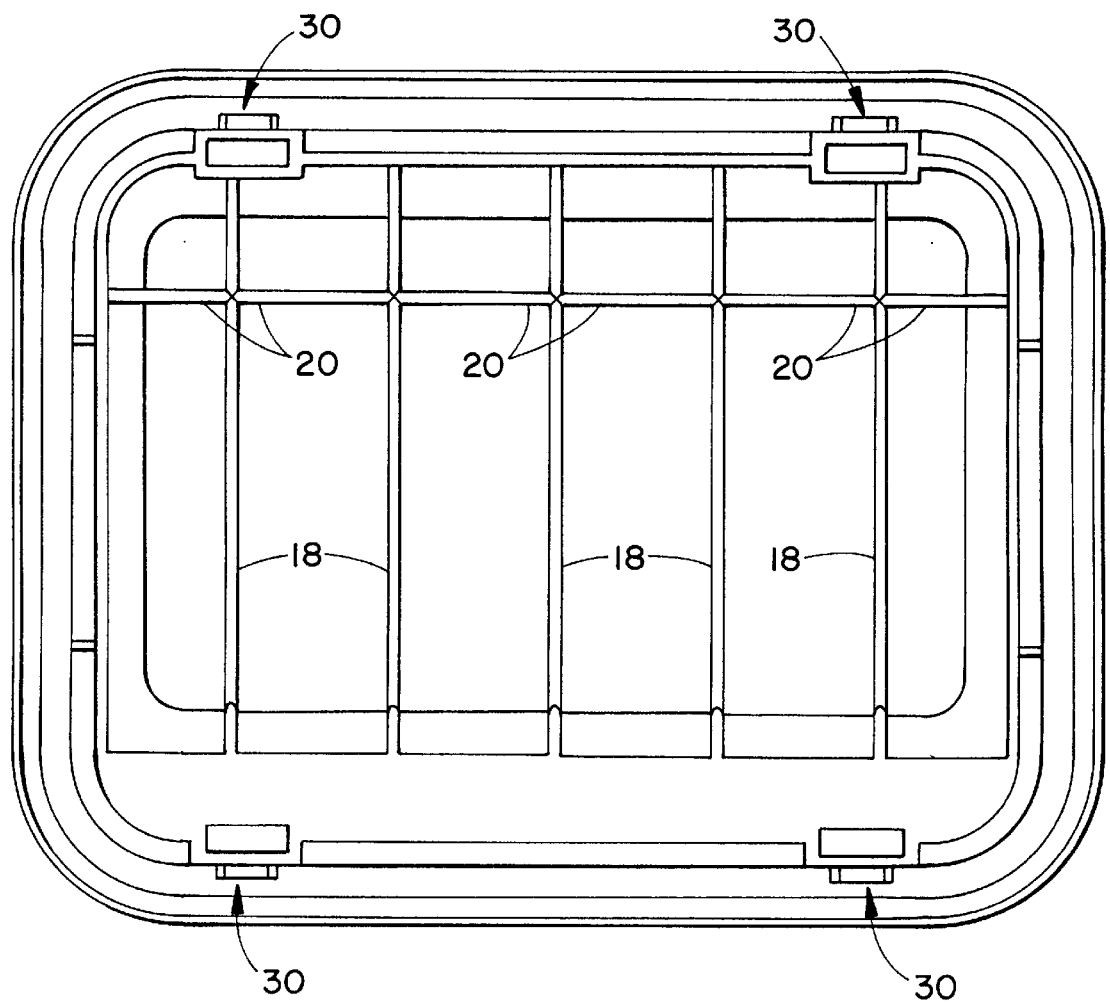
FIG. 3 is a back plan view of the structure shown in FIG. 1.
Figure 4:
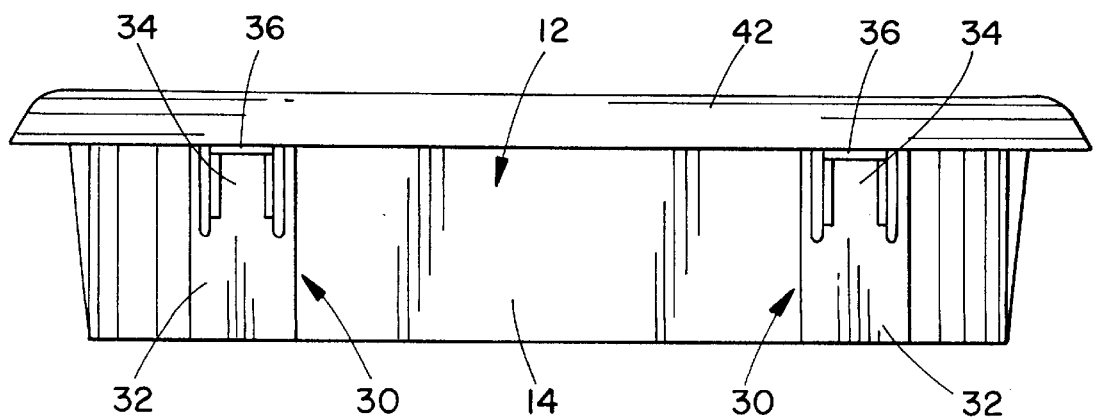
FIG. 4 is a front elevational view of the preferred embodiment.

Referring now to the drawings wherein the showings are for the purposes of illustrating the preferred embodiment of the invention only and not for purposes of limiting same, the overall arrangement of the preferred form of a flap valve formed in accordance with the invention can best be seen by reference to FIG. 1. As shown therein, the flap valve assembly 10 comprises a generally rectangular main frame 12 having a circumferentially continuous side wall 14 which defines a central flow passage 16. The main frame 12 is, as noted earlier, circumferentially continuous and is injection molded from a relatively rigid, high strength plastic such as a high density polypropylene.

The details of construction of the preferred form of the main frame can best be seen by reference to FIGS. 2–6. As shown therein, the peripheral side wall 14 is continuous about the flow passage 16 and has transversely extending web members 18 (see FIG. 3) which extend across between the opposed side walls in the manner best seen in FIGS. 3, 5, and 6. The webs 18 rigidify the structure and are transversely connected by web members 20. As can be seen, the web members are inclined so that when the structure is mounted vertically in the side wall of a vehicle body panel or the like, the right-hand side of FIG. 6 is the bottom and assures that the flap valve 22 lies in a position where it can return automatically under the force of gravity.

The flap valve 22 is formed from a thin flexible sheet of a suitable air-impervious plastic material and is connected to the bottom of the main frame 12 along its left-hand edge (as viewed in FIG. 6). As noted earlier, the flap is arranged to overlie the air flow passage 16 and to rest on the webs 18 and 20. As can be seen, a suitable inwardly extending flange 24 is carried on the interior of the main frame and is sized and arranged so as to engage about the periphery of the flap valve 22 when the valve is in its closed position.

The manner in which the flap valve is connected to the main frame is more fully claimed and described in prior U.S. Pat. No. 5,601,117 issued Feb. 11, 1997 to Jeffrey C. Lewis, et al. and entitled "Flap-Type Pressure Relief Valve." Broadly, however, the left-hand edge of the flap valve element 22 is received on outwardly extending molded pins 26 and retained thereon by a pivotally mounted web member 27 which can be moved downwardly over the pins and retained thereon in any convenient manner such as by heat staking the pins downwardly to retain the flap in position as shown in FIG. 6. This particular part of the structure forms no part of the invention and could vary substantially from that shown.

Molded integrally with the continuous side wall 14 of the main frame 12 are resilient retainers 30. The retainers 30 can best be understood by reference to FIGS. 1, 4, and 6. As shown therein, generally rectangular, elongated housings 32 extend outwardly from the side wall 14 of the main frame. The outer wall of the rectangular housing 32 has a U-shaped cut formed therethrough so as to provide a flexible and pivotal tab member 34 which extends upwardly toward the upper end of the main frame. The upper end of this tab is provided with an outwardly extending shoulder portion 36. It should be understood that there are preferably two of the retainers along each of the major sides of the main frame at the locations shown in FIG. 3.

Referring again to FIG. 6, it will be seen that the flange portion 36 at the upper end of the flexible tab 34 is located just below a continuous, radially extending, upper main frame flange 40. This allows a vehicle body panel or the like to be resiliently engaged between the flange 40 and the flange 36. Note that the entire main frame can be inserted into a body panel opening and the retainers 30 deflected radially inward to pass through the opening after which they return to their solid line normal position shown in the drawings to clamp the body panel edge opening therebetween.

Of particular interest and importance to the subject invention is the arrangement and formation of a circumferentially continuous, resilient gasket member 42 about the entire upper end of the main frame 14. In the preferred form, the gasket 42 is a lip-type gasket having a relatively thick base and tapering to a relatively thin flexible free end. As best seen in FIGS. 5 and 6, the gasket 42 extends radially outward and generally in a direction toward the associated retainers 30 so that the free end engages about the body panel opening with substantial force when the valve assembly is in its mounted position.

The gasket 42 is bonded to the outer surface of the rigid upper flange 40 of the main frame 12. In constructing the gasket, a plastic significantly more resilient and flexible than the plastic forming the main frame is used. For example, one suitable plastic is Santaprene 101-73. This plastic will bond to and integrally join with the plastic of the main frame when brought into contact therewith under normal injection molding conditions.

Figure 7:
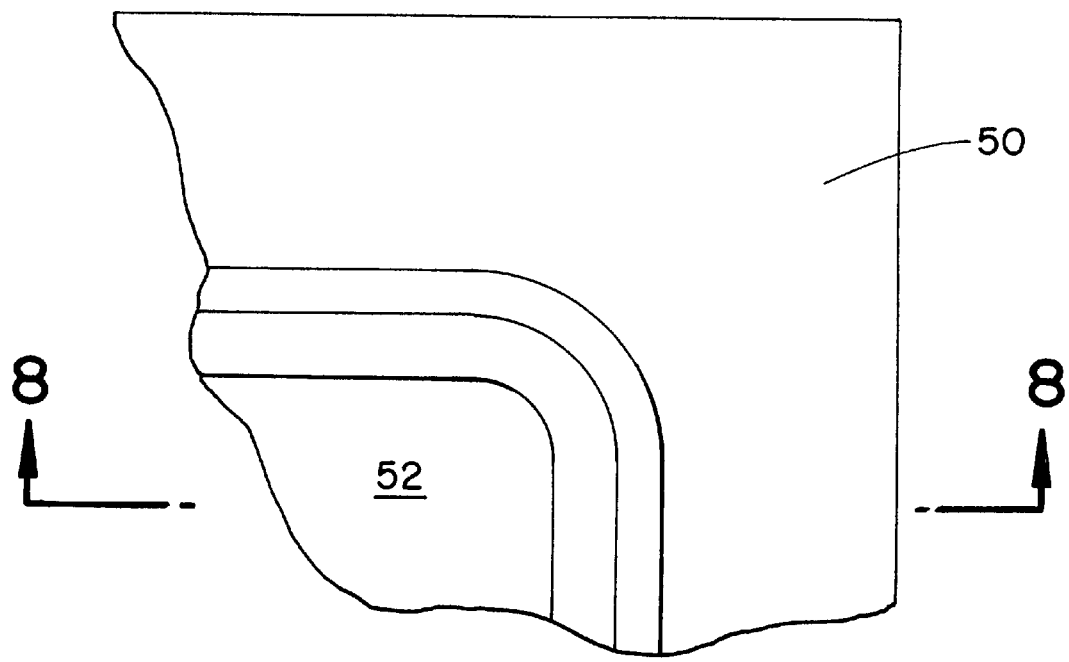
FIG. 7 is a top plan view of a corner of the bottom mold structure used for molding the gasket in place on the frame; and, FIG. 8 is a cross-sectional view taken on line 8—8 but showing the main frame in position in the injection molding molds preparatory to forming the gasket to the main frame.
Figure 8:
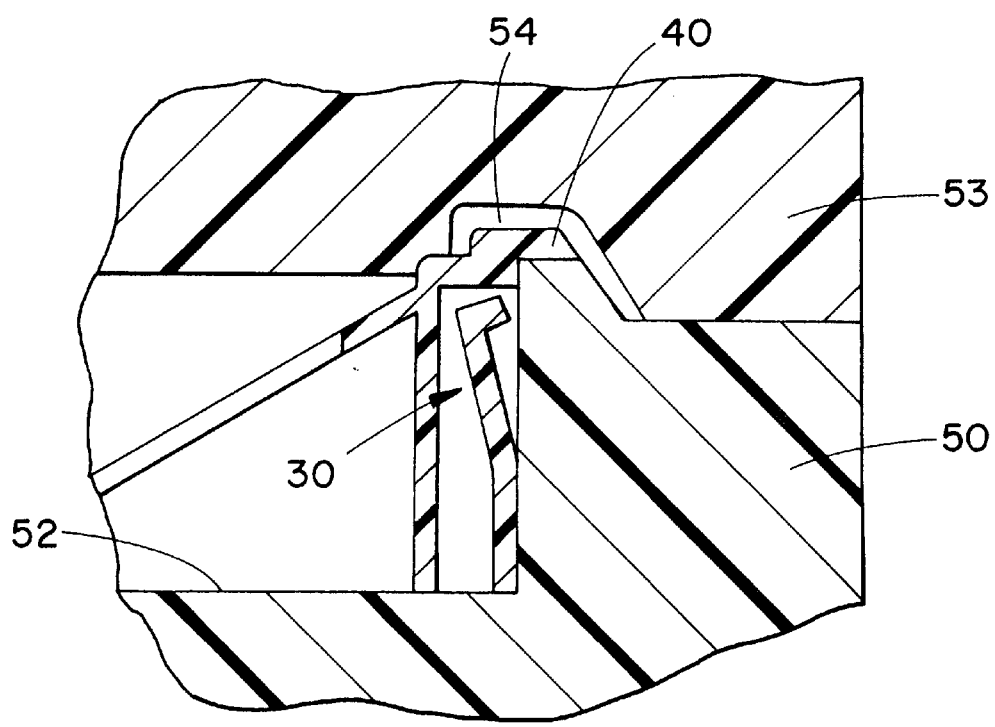

The arrangement for forming the gasket 42 in position on the upper flange of the main frame 12 can best be understood by reference to FIGS. 7 and 8. In particular, the main frame is suitably received in a first mold half 50 which constitutes the ejection side of an injection molding mold. The previously molded main frame is arranged as shown in FIG. 8 to be received down into a suitable, closely configured chamber 52 so that only the upper, radially extending flange 40 is exposed above the chamber 52. Preferably, the resilient clips 30 are deflected inwardly during the insertion of the main frame into the chamber 52. After the main frame is suitably inserted in the first mold half 50, a second mold half 53 is moved into position thereover as shown in FIG. 8. The second mold half is provided with a gasket-forming chamber 54 which extends axially into the mold half to provide a chamber having the necessary shape and contour of the gasket. Thereafter, the plastic forming the gasket is injected into chamber 54 and, through heat and pressure, suitably bonds directly to flange 40. When ejected from the mold, the gasket and main frame are a unitary structure.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a method of forming a flap-type pressure relief valve including a main frame defining a flow passage, a circumferentially extending wall portion that lies in a position radially outward of the flow passage, and a flap valve element positioned to overlie the flow passage, the improvement wherein:

the main frame and wall portion are first molded of a first relatively rigid plastic and subsequently positioned in a mold contoured to provide a gasket-forming chamber about the periphery of the main frame with said circumferentially extending wall portion of the main frame constituting a wall of the gasket-forming chamber, and thereafter injecting a resilient second plastic into the gasket-forming chamber under conditions to fill the gasket-forming chamber and integrally bond to the said wall portion of the main frame, and thereby ultimately forming a gasket having a first flexible free end located radially outwardly of said circumferentially extending wall portion and molded directly to said circumferentially extending wall portion.

2. The improved method as set forth in claim 1 wherein the gasket-forming chamber completely encircles the main frame and including the step of molding connecting retainers on the main frame at locations spaced from the gasket-forming chamber.

3. The improved method as set forth in claim 2 wherein the gasket-forming chamber is contoured to provide a flexible tapered lip seal type gasket extending outwardly from the main frame.

4. The improved method as set forth in claim 3 wherein said circumferentially extending wall portion is disposed in a plane generally perpendicular to said flow passage and wherein said gasket forming chamber overlies said wall portion, further including the additional step of positioning the main frame in a first mold component with said wall portion exposed and thereafter moving a second mold component into position to provide said gasket-forming chamber.

5. The improved method as set forth in claim 3 wherein said gasket-forming chamber is contoured to extend generally radially of said flow passage.

6. The improved method as set forth in claim 1 wherein the gasket-forming chamber is contoured to provide a flexible tapered lip seal type gasket having a first flexible free end located radially outwardly of the circumferentially extending wall portion with a base portion overlying and molded directly onto said circumferentially extending wall portion.

7. The improved method as set forth in claim 6 wherein the gasket-forming chamber is contoured to provide said flexible tapered lip seal type gasket having a shape that tapers from said base portion to said first free end.

8. The improved method as set forth in claim 4 wherein:
the step of positioning the main frame in said first mold component includes receiving the main frame in a first mold half with said wall portion exposed; and,
the step of moving said second mold component includes moving a second molded half into position over said main frame received in said first mold half to provide said gasket-forming chamber.

9. The improved method as set forth in claim 8 wherein the gasket-forming chamber is contoured to provide a flexible tapered lip seal type gasket having a first flexible free end located radially outwardly of the circumferentially extending wall portion with a base portion overlying and molded directly onto said circumferentially extending wall portion.

10. The improved method as set forth in claim 9 wherein the gasket-forming chamber is contoured to provide said flexible tapered lip seal type gasket having a shape that tapers from said base portion to said first free end.

11. A flap-type pressure relief valve comprising:
a molded plastic main frame including a rigid peripheral side wall defining a central flow passage;
a flexible flap valve element joined to said main frame and overlying said central flow passage to permit flow in one direction while preventing flow in the opposite direction;
an upper end of said main frame having a circumferentially extending wall portion lying radially outwardly of said central flow passage and joined to said rigid peripheral side wall; and,
a gasket formed continuously about said upper end of the main frame and having a first flexible free end located radially outwardly of said circumferentially extending wall portion with a base portion overlying and molded directly to said circumferentially extending wall portion to bond thereto, said gasket molded from a plastic significantly more resilient and flexible than the plastic forming the main frame but selected to permanently bond thereto when brought into contact therewith under injection molding conditions.

* * * * *